United States Patent [19]
Rubinstein

[11] 3,971,841
[45] July 27, 1976

[54] MOLDING DEVICES AND PROCESS FOR MAKING A MOLDED PLASTIC LENS MOUNT

[75] Inventor: Leon Rubinstein, Natick, Mass.

[73] Assignee: Polaroid Corporation, Cambridge, Mass.

[22] Filed: June 20, 1974

[21] Appl. No.: 481,128

[52] U.S. Cl. ............................... 264/275; 264/334; 249/59; 249/95; 425/808; 425/438
[51] Int. Cl.² ..................... B29C 1/14; B29D 11/00
[58] Field of Search ................ 249/59, 95; 425/125, 425/808, 438; 264/275, 334

[56] References Cited
UNITED STATES PATENTS

| | | | |
|---|---|---|---|
| 2,266,169 | 12/1941 | Crumrine | 249/95 |
| 2,304,984 | 12/1942 | Wood | 425/808 X |
| 2,336,423 | 12/1943 | Rieser | 249/59 X |
| 2,559,860 | 7/1951 | Fay | 425/808 X |
| 3,241,193 | 3/1966 | Pohlman | 249/95 X |
| 3,481,000 | 12/1969 | Barfuss | 249/59 UX |

*Primary Examiner*—Robert D. Baldwin
*Attorney, Agent, or Firm*—John S. Vale

[57] ABSTRACT

Molding devices and methods for producing a low cost, multi-element, adjustable focus lens assembly for use in photographic apparatus. The assembly features a two-part molded plastic lens mount comprising forward and rear mounts, each having an uncentered lens element insert molded and centered therein and an integrally molded screw thread for coupling the forward and rear mounts together. The molding devices comprise cavity molds having movably mounted zonal clamps therein for centering the lens element within the cavity and for disengaging the molded mounts from surfaces in the molds that form the screw threads.

19 Claims, 8 Drawing Figures

MOLDING DEVICES AND PROCESS FOR MAKING A MOLDED PLASTIC LENS MOUNT

BACKGROUND OF THE INVENTION

1. Field of the Invention

The present invention relates to the field of photography and more specifically, to multi-element lenses for use in photographic apparatus.

2. Description of the Prior Art

The present invention addresses itself to the problem of economically manufacturing large numbers of precision multi-element objective lenses.

The degree to which a multi-element lens approaches its design specification is, to a large extent, determined by the precision with which the individual lens elements are aligned or optically centered with respect to one another in a lens mount, assuming of course that the individual lens elements are within their design tolerances.

The opposing curved surfaces of a simple lens element may be thought of as sections of two spheres. The optical axis of such a lens lies along an imaginery line joining the centers of the two spheres. The geometrical axis, on the other hand, is an axis of symmetry of the circular peripheral edge of the lens element. When the optic and geometrical axes coincide, the lens is said to be "centered".

Traditionally, a lens is centered by mounting it in an edge grinding machine so that it rotates about the optical axis. The peripheral edge is then ground to a predetermined diameter thereby making the optic and geometrical axes coincidental. A plurality of centered elements are mounted in a cylindrical hollow lens mounting tube to form the multi-element lens assembly.

Alignment of the lens elements, with respect to one another, is accomplished mechanically. The interior surface of the mounting tube acts as a common reference surface against which the peripheral edge of each lens element abuts. As would be expected, the precision with which the assembled multi-element lens is centered depends on the tolerances to which the interior surface of the mounting tube and the diameters of the individual lens elements are machined.

An example of a multi-element, adjustable focus, lens assembly constructed in the above-described traditional manner is disclosed in a now abandoned application Ser. No. 101,745, filed on Dec. 28, 1970 by Rosario J. Messina, said abandoned application being assigned to the same assignee as the present application.

Grinding the peripheral edges of the individual lens element is an expensive operation. When multi-element lenses are manufactured in large volumes, it represents a significant percentage of the total manufacturing cost, not only because of the need for skilled personnel, but also the time it takes to accurately center each of the lens elements on its optical axis in the grinding machine.

An alternative to edge grinding is disclosed in U.S. Pat. Nos. 2,304,984; 2,388,893; 2,266,169; 2,341,364 and 2,245,257. A simple uncentered lens element is held between a pair of opposed zonal clamps axially disposed in the cavity of a cylindrical mold. The zonal clamps each include a hemispherical cup bounded by a low friction annular ring which engages one of the spherical curved surfaces of the lens element. When the lens element is held between the opposed rings, it slides transversely to the axial centerline of the clamps until the optical axis of the lens element coincides with the centerline of the clamps and the geometrical axis of the cylindrical mold. Plastic is then injected around the periphery of the lens element to form a rim which compensates for difference in radial measurements between the peripheral edge of the lens element and the optic and geometric axes. The lens element is now "centered" with respect to the outside edge of the plastic rim and this "lens cell" may be inserted into a lens mounting tube to form a multi-element lens in cooperation with other lens cells.

In general, the previously mentioned patents teach the concept of molding a compensating rim onto a glass or plastic lens element. The molded lens cells are then individually inserted into a metal or molded plastic lens mounting tube, in the conventional manner, to form a multi-element lens. U.S. Pat. No. 2,266,169 carries this process one step further by disclosing a viewfinder in which two lens elements are held in optically centered alignment and predetermined spaced relation by two pair of zonal clamps. Plastic is then injected to form three sides of a square lens mounting tube which has sections integrally formed therewith for retaining the two aligned lens elements. The fourth side of the tube is left open to permit the removal of zonal clamps disposed between the forward and rear lens elements. A cover for the open side of the lens mounting tube is molded separately and is cemented in place after removal of the clamps.

The prior art molded plastic lens mounting systems are mainly directed to fixed focus multi-element lenses. That is, the plastic rimmed lens cells are permanently mounted in fixed spacial relation with respect to one another to form the multi-element lens. Also the prior art systems feature rather large air spaces between adjacent lens elements and the front to rear thickness of the plastic centering rims do not pose a problem such as when the design of the multi-element lens requires that at least two of the lenses be separated by a minimum air gap. Also, the lens elements are not integrally molded into a complete encircling mounting tube thus requiring additional molding and assembly operations.

SUMMARY OF THE INVENTION

The present invention provides molding devices and methods for producing an economical multi-element adjustable focus, lens assembly which has optical precision and yet readily lends itself to large volume manufacture.

In a preferred embodiment, the multi-element lens assembly is configured for use in a photographic apparatus of the type that includes a between-the-lens shutter and/or aperture defining mechanism and a lens focusing mechanism.

The lens assembly features a two part molded plastic lens mount, comprising a forward mount having an uncentered lens element insert molded and centered therein and a rear mount having one uncentered lens element insert molded and centered therein and integrally molded structure for supporting, aligning and retaining two additional centered lens elements in optical alignment with the insert molded element.

The forward and rear lens mounts are coupled together by integrally molded screw threads, such that the forward mount may be displaced, axially, in response to rotating the forward mount relative to the rear mount for focusing purposes. The forward mount includes integrally molded gear teeth, on an exterior surface thereof, which are adapted to mesh with a gear on the camera mounted focusing mechanism.

The rear mount includes, in addition to the insert molded lens element and the coupling screw thread, an integrally molded seat for supporting the centered lens elements which are to be inserted into the rear mount after the molding operation. The centered (edge ground) lens elements are aligned on the geometrical axis of the rear mount, in optical alignment with the insert molded element, by an integrally molded aligning surface. Once inserted, the two centered elements are retained in the rear mount by a heat deformable rim that is integrally molded with the rear mount during the initial molding operation. The rear mount also includes an integrally molded pair of access slots therein, through which the camera mounted shutter and/or aperture defining mechanism extends so as to be located in an air space between the insert molded lens element and one of the centered lens elements. In a preferred embodiment, the rear mount also includes a pair of integrally molded mounting arms that serve as the means for coupling the rear lens mount to the camera.

The molding devices for forming the forward and rear mounts comprise cavity molds which each include first and second mold sections that are movable between an open position and a closed position wherein the first and second mold sections are aligned in abutting relation on a common geometrical axis of the mold. A portion of the internal cavity is formed by first and second opposed zonal clamps which are movably mounted, respectively, in the first and second mold sections on a geometrical axis of the mold.

Each zonal clamp includes low friction rings on their respective opposed ends for engaging the opposite optical surfaces of the uncentered lens element. The first zonal clamp is mounted for axial displacement towards the second zonal clamp for causing the low friction rings to exert a compressive force on the uncentered lens element thereby displacing the lens element in directions transverse to the geometrical axis of the mold until the optical axis of the lens element is coincident with the geometrical axis of the mold.

The second zonal clamp is mounted for both axial rotation and displacement to disengage the molded screw thread from the mold surface that forms the screw thread when plastic is injected into the cavity.

The molding device for forming the rear mount also includes a pair of opposed surfaces that are in contacting relation within the bounds of the cavity for selectively blocking the flow of plastic into predetermined portions of the cavity thereby forming a pair of opposed slots in the molded mount through which a camera mounted shutter and/or aperture defining mechanism may extend into an air space between two lens elements mounted in the rear lens mount.

Therefore it is an object of the invention to provide molding devices and processes for producing a low cost, multi-element, adjustable focus lens assembly which includes forward and rear molded plastic lens mounts each having an uncentered lens element insert molded and centered therein and integrally molded screw threads for coupling the forward and rear mounts together.

It is another object of the invention to provide a molding device for forming a molded plastic lens mount about the periphery of an uncentered lens element and simultaneously forming a pair of opposed slots in the mount for receiving a between-the-lens shutter and/or aperture defining mechanism.

Other objects of the invention will in part be obvious and will in part appear hereinafter.

BRIEF DESCRIPTION OF THE DRAWINGS

The novel features that are considered characteristic of the invention are set forth with particularity in the appended claims. The invention itself, however, both as to its structure and its operation together with the additional objects, features and advantages thereof will be best understood from the following description of the preferred embodiment when read in connection with the accompanying drawings wherein:

DESCRIPTION OF THE PREFERRED EMBODIMENT

Figure 1:
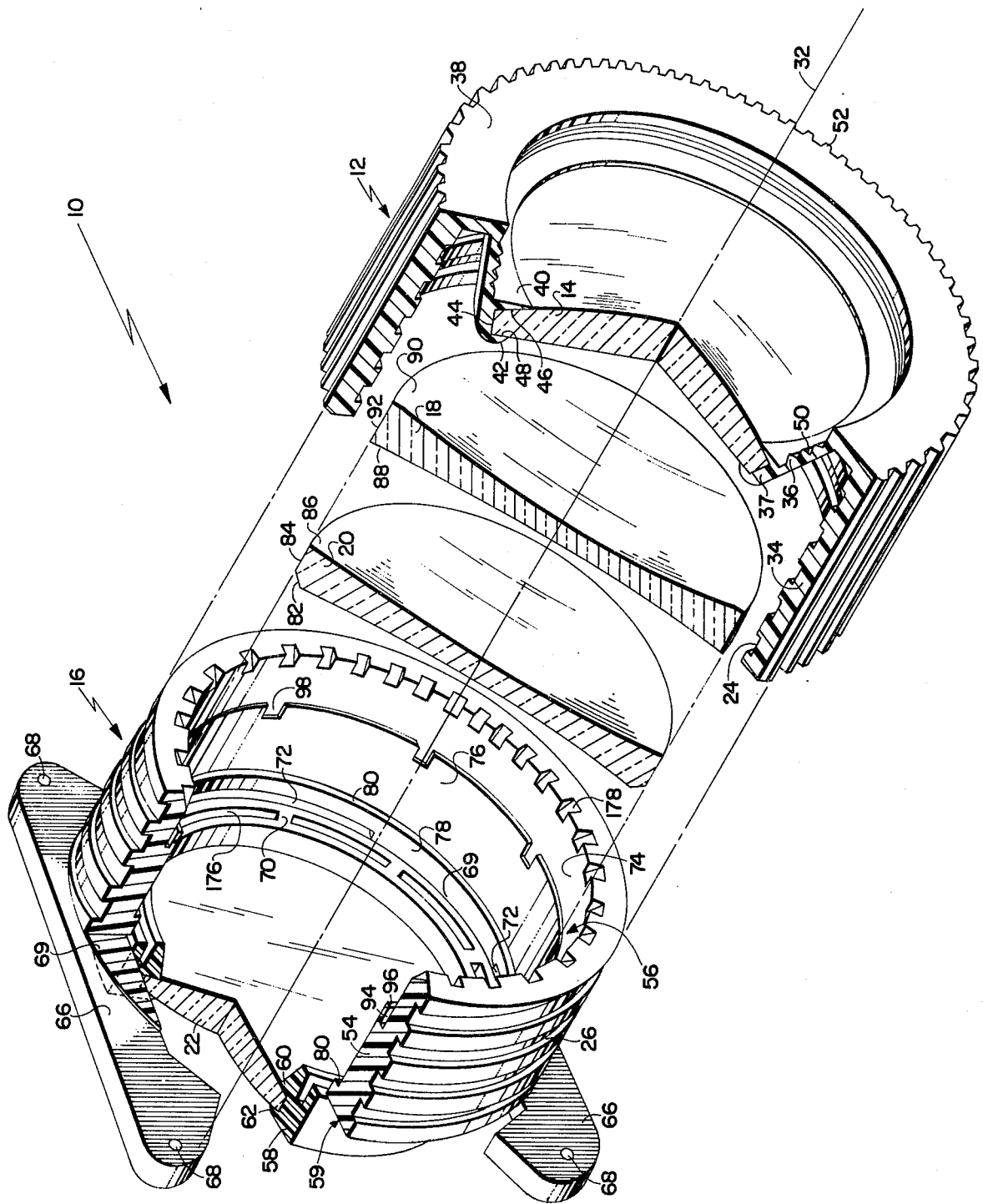
FIG. 1 is an exploded perspective view, partly in section, showing forward and rear molded plastic lens mounts of a multi-element, adjustable focus, lens assembly.
Figure 2:
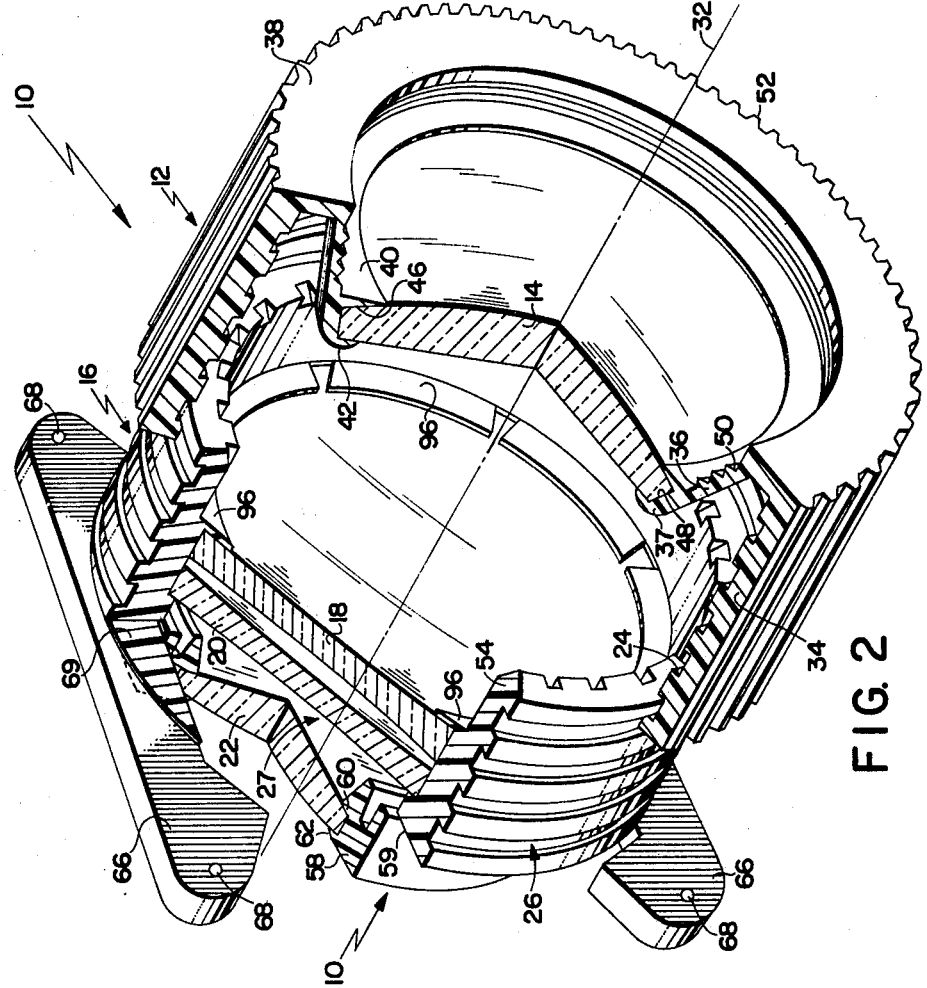
FIG. 2 is a perspective view, partly in section, of the forward and rear mounts of FIG. 1 with additional lens elements retained in the rear mount by a heat deformed retaining ring.

A multi-element, adjustable focus objective lens assembly 10 is shown in FIGS. 1 and 2 of the drawings. It comprises a two part lens mount including a first or front molded plastic lens mount 12 having a front lens element 14 insert molded therein and a second or rear molded plastic lens mount 16 retaining a grouping of three lens elements 18, 20, and 22. In a preferred embodiment, at least the rearwardmost lens element 22 is insert molded into the rear lens mount 16.

The front and rear mounts 12 and 16 include integrally molded complementary and axially disposed helical screw threads 24 and 26, respectively, which are used to couple the front and rear mounts 12 and 16 together (See FIG. 2) and effect the axial displacement of front lens element 14 relative to the fixed group of rear elements 18, 20 and 22 to focus objective lens assembly 10.

The illustrated lens assembly 10 is a compact, air spaced, adjustable focus, photographic objective that is configured for use with a between-the-lens shutter and aperture defining mechanism. The outer lens elements 14 and 22 are positive or convergent lenses and the interior pair of elements 18 and 20 are divergent lenses. As will be described in detail later, a between-the-lens shutter and aperture defining mechanism is adapted to be located in an air space 27 between lens elements 20 and 22 (See FIG. 2).

Classifying lens assembly 10 as compact relates to the fact that its overall length is less than ⅛th of its focal length.

A detailed description of the radii of curvature and index of refraction of each of the four glass lens elements 14, 18, 20 and 22 is not necessary to the understanding of the present invention and will not be presented in this disclosure. These particular lens elements merely serve as a vehicle for disclosing the inventive concepts involved in producing a multi-lens assembly that is relatively economical and is well suited for large volume production.

For those who are interested in the optical information, reference may be had to commonly assigned U.S. Pat. No. 3,619,036, issued to J. G. Baker on Nov. 9, 1971 and application Ser. No. 320,612, filed Jan. 2, 1973.

A four element objective of the type disclosed in the aforementioned U.S. Pat. No. 3,619,036, is particularly well suited for use in a compact camera that uses a relatively large (snap-shot size) film unit. For example, the self-developing SX-70$^{TM}$ Land Camera, sold by the Polaroid Corporation, Cambridge, Mass., includes such an adjustable focus objective, having a focal length of approximately 4.58 inches, for exposing a photosensitive area of the film unit that measures approximately 3⅛ × 3⅛ inches. The focusing range of the objective lens is from 10 inches to infinity.

The objective for the above-mentioned camera is manufactured in the traditional manner. A two part lens mount is machined from brass and then is surface treated to apply a non-reflective dark colored coating. The four glass lens elements must be individually edge ground so that they will be centered when the objective is assembled. The machining, edge grinding, and assembly operations are expensive and the ultimate cost of the objective is increased further by a certain percentage of the assembled objectives that do not meet design specifications, the most common defect being failure to meet the centering tolerances.

Figure 3:
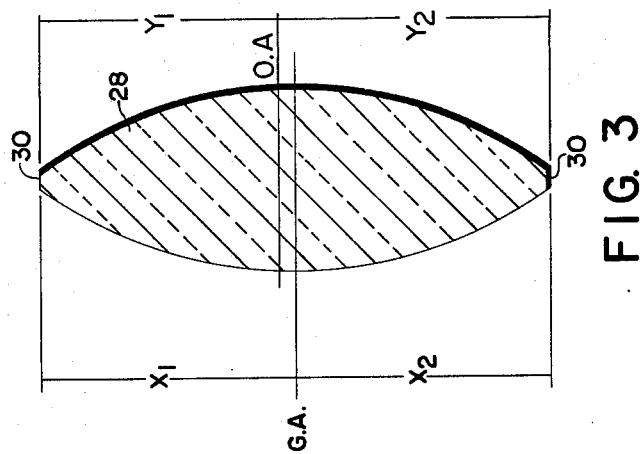
FIG. 3 is a diagrammatic illustration of a simple lens uncentered element showing the optical axis in an eccentric relation to the geometrical axis of the lens element.

FIG. 3 diagrammatically illustrates a simple, uncentered glass lens element 28 after it has received its final polishing. Because of variations in batch manufacturing processes, its optical axis O-A is usually not concentric with its parallel geometrical axis G-A. That is, diametrically opposed points along the circular peripheral edge 30 of element 28, measured radially, are symmetrically disposed with respect to the geometrical axis G-A (radial measurement $X_1$ being equal to $X_2$) but these same points are not symmetrically disposed with respect to the optical axis (radial measurement $Y_1$ not being equal to $Y_2$).

At this point, lens element 28 is uncentered. Before it can be mounted in a hollow cylindrical lens mount, it must be centered by rotating the lens element 28 about its optical axis O-A in a grinding machine and grinding the circular peripheral edge 30 until the eccentric geometrical axis G-A is brought into concentricity with O-A. Also, the peripheral edge 30 must be ground to a precise predetermined diameter to snuggly fit into the cylindrical lens mount.

STRUCTURAL DESCRIPTION OF THE LENS ASSEMBLY

The front and rear lens mounts 12 and 16 have a common longitudinal geometrical axis of symmetry, designated 32 in FIGS. 1 and 2.

The front mount 12 includes a generally cylindrical outer wall 34 and a concentric, truncated, conical inner wall 36 coupled, at its base, to the leading end of outer wall 34 by an integrally formed annular ring 38.

The forwardmost lens element 14 is insert molded in centered relation to axis 32, by a process to be described later, into a trailing end annular section 37 of truncated conical wall 36 and is retained in place by forward and rear, integrally formed, retaining rings 40 and 42, respectively.

In order to be consistent throughout the disclosure, when referring to parts of an individual lens element, the term peripheral edge will apply to the outermost edge of the element. For lens element 14, the peripheral edge is designated 44. The term circumferential surface will apply to those edge portions of the spherical faces of the lens elements adjacent and abutting the peripheral edge. When applied to lens element 14, the circumferential surfaces 46 and 48 are those surfaces that are contacted, respectively, by the forward and rear retaining rings 40 and 42. When the term "molded about the periphery of a lens element" is used, it will be understood that periphery means those portions of the lens element that are contacted by the molded mount thereby including both the peripheral edge and the opposed circumferential surfaces of the lens element.

In a preferred embodiment, the interior surface of conical wall 36, forward of lens element 14, includes a plurality of integrally molded, concentric, stepped ridges 50 for texturing this surface to reduce unwanted reflections therefrom which may impinge upon lens element 14.

Integrally molded with the exterior surface of outer wall 34 are longitudinally disposed gear teeth 52 which are adapted to mesh with a complementary gear on a camera mounted focusing mechanism (to be described later) to impart axial rotation (about axis 32) to the forward lens mount 12 for focusing purposes.

The axial screw thread 24 is integrally molded with the interior surface of outer cylindrical wall 34. In a preferred embodiment, thread 24 is a "modified square thread" but other shape threads may be used instead.

Rear lens mount 16 is somewhat more complex in shape than the front mount 12. In a preferred embodiment, the rear lens element 22 is insert molded into the rear lens mount 16 and the interior pair of divergent lens elements 18 and 20 are inserted into mount 16 after the molding operation.

In addition to structure for retaining the rear element 22 and the integrally formed helical screw thread 26, rear mount 16 includes an annular ring or seat for supporting the rearwardmost circumferential surface of lens element 20; a circular and deformable (preferably heat deformable rib or rim which is later formed into a retaining ring over the forwardmost circumferential surface of lens element 18; an alignment surface for aligning elements 18 and 20 with axis 32; access means, preferably a pair of slots, for receiving a between-the-lens shutter and aperture defining mechanism; and a pair of mounting arms for fixedly securing rear mount 16 to a camera or other photographic apparatus.

As best shown in FIG. 1, mount 16 includes a cylindrical wall 54 having an open forward end 56. Integrally formed on the exterior surface of cylindrical wall 54 is the axisl helical screw thread 26. Thread 26 is of the modified square type and mates with thread 24 on mount 12.

The rear lens element 22 is insert molded into an annular support or retaining ring 58 positioned rearwardly of the trailing end 59 of cylindrical wall 54. Support 58 has integrally molded forward and rear retaining rings 60 and 62 that extend inwardly slightly from the peripheral edge of element 22 on the opposed circumferential surfaces thereof. As will be described later, uncentered glass lens element 22 is centered, with respect to the longitudinal axis 32 of mount 16 during the molding process.

Integrally molded with the portions of annular support 58 and the trailing end 59 of cylindrical wall 54 are a pair of opposed, horizontal (as viewed in FIG. 1) mounting arms 66 which serve as means for coupling the rear lens mount 16 to the camera. In a preferred embodiment, each arm 66 includes a pair of holes 68 for receiving attaching screws or the like. However, one skilled in the art will appreciate that mounting arms 66 may be fixedly secured to the camera by other means such as adhesive, ultrasonic or thermo-bonding.

Mounting arms 66 also serve as points of connection or bridges 69 between the trailing end surface 59 of cylindrical wall 54 and a leading end surface 70 of annular lens element support 58. This construction spaces surface 70 from 59 and defines a pair of opposed radial slots 72 in mount 16, between the upper and lower points of connection 69, for receiving a between-the-lens shutter and/or aperture defining mechanism (to be described later). In a preferred embodiment, the opposed radial slots 72 each have an angular measurement of approximately 130°.

The interior of rear mount cylindrical wall 54 is defined by three cylindrical surfaces 74, 76 and 78 which have progressively smaller inside diameters. Surface 74, at the leading end of mount 16, has the largest inside diameter [I.D.]. The intermediate surface 76 has an I.D. that is just slightly larger than the outside diameter (O.D.) of the interior divergent lens element 18 and 20 and serves as an alignment surface for centering these elements with respect to axis 32. The rearwardmost surface 78 has an I.D. that is slightly smaller than the O.D. of elements 18 and 20.

The transition surface between surfaces 76 and 78 forms a beveled step or annular seat 80 for receiving and supporting lens element 20. In a preferred embodiment, lens element 20 incluldes a beveled rear circumferential surface 82 adjacent its peripheral edge 84 and annular seat 80 is formed at an appropriate conforming angle.

The opposed or forward circumferential surface 86 of element 20 is flat or plano as are the opposed rear and forward circumferential surfaces 88 and 90 of lens element 18.

The peripheral edges 84 of lens element 20 and 92 of element 18 are edge ground to a predetermined diameter in the traditional manner. These elements are centered with respect to the geometrical axis 32 of mount 16 by the intermediate alignment surface 76 against which peripheral edges 84 and 92 bear when lens element 20 and 18 are inserted into rear mount 16. However, in this particular lens design, the centering of the front element 14 with respect to rear element 22 is much more important to the optical performance of the lens than the centering of elements 18 and 20 with respect to one another and to elements 14 and 22.

To give some indication of the relative tolerances, lens elements 14 and 22 must be centered within 0.001 of an inch with respect to each other or within 0.0005 of an inch of the geometrical axis 32 of the mount. On the other hand, surface 76 has a tolerance of 0.0005 of an inch [T.I.R.] with respect to the geometrical axis 32 of the mount the peripheral edges 84 and 92, respectively, of elements 20 and 18 are ground to ±0.0009 of an inch.

As best shown in FIG. 1, the leading end of surface 76 extends over the trailing end of surface 74 thereby defining a circular channel 94 therebetween. This structure produces a thin axially disposed rim 96 which is adapted to be deformed, after elements 18 and 20 are inserted into mount 16, to form a retainer which abuts the circumferential surface 90 of lens element 18 as shown in FIG. 2. It will be noted that molded rim 96 includes slots 98 about its periphery to facilitate the inward bending.

MOLDING DEVICE AND PROCESS

The front lens mount 12 is molded around the periphery of lens element 14 in a cavity mold 100. Mold 100 (shown in its closed position in FIG. 4) includes an upper mold section 102 and a lower mating mold section 104 that are movable between an open position and a closed position wherein mold sections 102 and 104 are operatively positioned in abutting relationship along a mold parting line designated 106.

Centrally disposed in mold 100, in concentric relation with a mold vertical geometric axis 108, are a pair of opposed zonal clamps 110 and 112 for holding lens element 14 and centering it with respect to the geometric axis 108. In addition, certain surfaces of zonal clamps 110 and 112 serve to define an internal cavity into which plastic is injected to form mount 12.

In a preferred embodiment, zonal clamp 110 is mounted in the upper molded section 102 for axial displacement along axis 108. The opposed clamp 112 is mounted in the lower mold section 104 for both axial displacement and rotation. However, during the actual centering operation and subsequent molding process, clamp 112 is maintained in the fixed position shown in FIG. 4. The rotation and displacment of clamp 112 is utilized after mount 12 is formed to eject it from the mold 100.

The lower end of zonal clamp 110 is configured as a cup 114 which is bounded by a depending, low friction, lens contacting, annular ring 116. Ring 116 is dimensioned to contact lens element 14 such that the outer peripheral edge of ring 116 defines the bounds of the interior edge of the forward lens retainer 40.

The lower zonal clamp 112 also includes in a cup shaped end (designated 118) which is bounded by an upstanding, low friction, annular ring 120 for contacting the rear surface of lens element 14.

With the uncentered glass lens element 14 positioned, in the closed mold 100, between the upper ring 116 and the lower ring 120, the movable upper clamp 110 is displaced downwardly along axis 108 toward the fixedly positioned lower clamp 112 so that rings 116 and 120 make contact, respectively, with the forward and rear optical surfaces of lens element 14. Clamp 110 may be moved downwardly by any suitable mechanism (not shown) such as a pneumatic or hydraulic ram or a loading spring.

The compressive force (approximately 130 to 170 lbs.) exerted on lens element 14 causes it to slide on the low friction rings 116 and 120 in directions transverse to the mold axis 108 until it reaches an equilibrium position indicating that the rings 116 and 120 are everywhere in contact with points on the curved surfaces of lens element 14 that are equidistant from the optical axis of the lens element 14. When equilibrium is reached, the optical axis of the lens is centered or is coincident with the geometric axis 108 of mold 100.

It will be understood that the term coincident is used, not in its absolute mathematical sense, but rather in terms of practical manufacturing tolerances. For example, the manufacturing specification for lens assembly 10 requires that the forward lens element 14 be aligned or centered within 0.001 of an inch with respect to the rear lens element 22. Stated another way, the exterior pair lens element 14 and 22 must be centered within 0.0005 of an inch with respect to the geometric axis 32 of lens mounts 12 and 16. The centering requirement is not as stringent for the interior pair of elements 18 and 20. Typically, these elements may be optically centered within 0.0008 of axis 32 without diminishing optical performance.

It has been found that the zonal clamps 110 and 112 reliably center lens element 14 within a range of 0.0002 to 0.0005 of an inch with respect to mold axis 108 which coincides with the geometric axis 32 of mount 12. Thus, for the purposes of this disclosure, the term coincident means centering lens element 14 to the above manufacturing specification.

Figure 4:
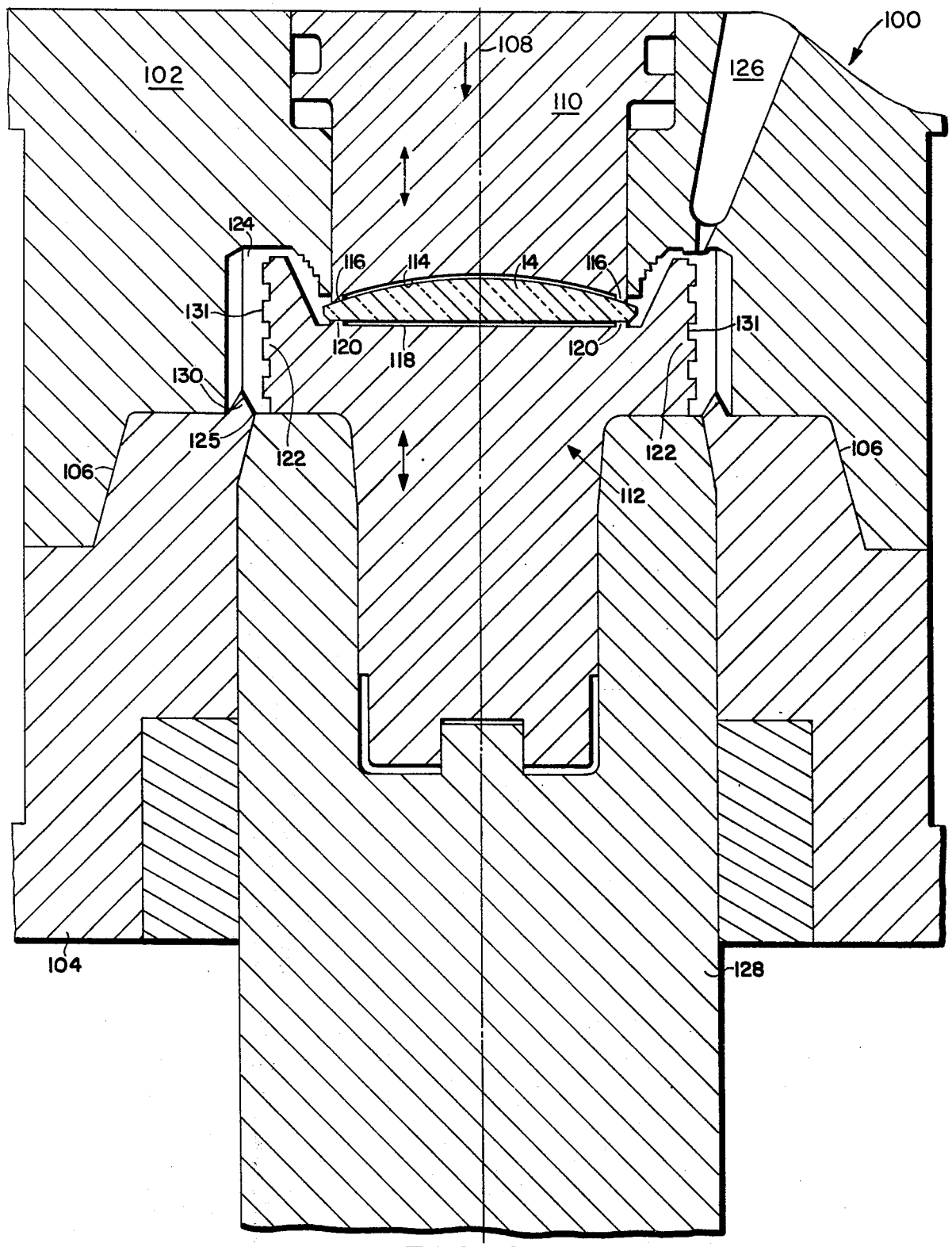
FIG. 4 is a molding device, shown in section, for forming the forward lens mount with an uncentered lens element insert molded therein.

The lower zonal clamp 112 includes a male plug section 122, outboard of ring 120, which extends into a female cavity 124 in the upper mold section 102 to define in cooperation with the outer peripheral surfaces of rings 116 and 120 and a surface 125 on mold section 104, the complementary shape (cavity) of mount 12 into which plastic is injected through a plurality of gates 126 in upper mold section 102 (only one of which is shown in FIG. 4).

In a preferred embodiment, the lower zonal clamp 12 is in the form of a removable insert which is keyed to a rotatable and axially displaceable shaft 128 in the lower mold section 104. The fixed surface 125 of lower mold section 104 adjacent shaft 128, includes a plurality of spaced upstanding teeth 130 which extend into the trailing end of the molded cylindrical mount wall 34.

After the plastic is injected, the upper mold 102 is moved upwardly to open the mold 100. The molded mount 12 is held in a fixed position relative to mold section 104 by teeth 130 and shaft 128 is rotated to unscrew a thread forming surface 131 on zonal clamp 112 from the molded screw thread 24 formed on the interior surface of mount cylindrical wall 34. The rotation of shaft 128 causes it, and clamp 112, to be displaced axially (downwardly), relative to the fixed portion of lower mold section 104, until the mount 12 is free from the zonal clamp insert 112. After mount 12 is removed from teeth 130, the shaft 128 is rotated in the opposite direction to drive it upwardly to the position shown in FIG. 4. Another lens element 14 is inserted, mold section 102 is lowered into place, zonal clamp 110 is moved downwardly to center lens element 14, and plastic is injected to form another mount 12.

As was noted earlier, manufacturing economy is realized because lens element 14 is not edge ground. Thus, when it is centered by the zonal clamps 110 and 112, its optical axis, not its geometric axis, coincides with the mold axis 108. This means that the peripheral edge 44 of lens element 14 is not symmetrically disposed with the molded lens retainer 37 or trailing end of conical section 36 of mount 12 but rather that the molded retainer 37 is molded in such a manner to compensate for any eccentricity between the geometric and optical axes of the lens element 14. This compensation results in the optic axis of lens 14 being coincident with the geometric axis 32 of mount 12 while the peripheral edge 44 of element 14 is eccentric with respect to axis 32.

As a further indication of the precision with which mounts 12 and 16 are molded, the helical screw threads 24 and 26 are held to tolerances of 0.00015 of an inch when measured radially from the axis 32.

Figure 5:
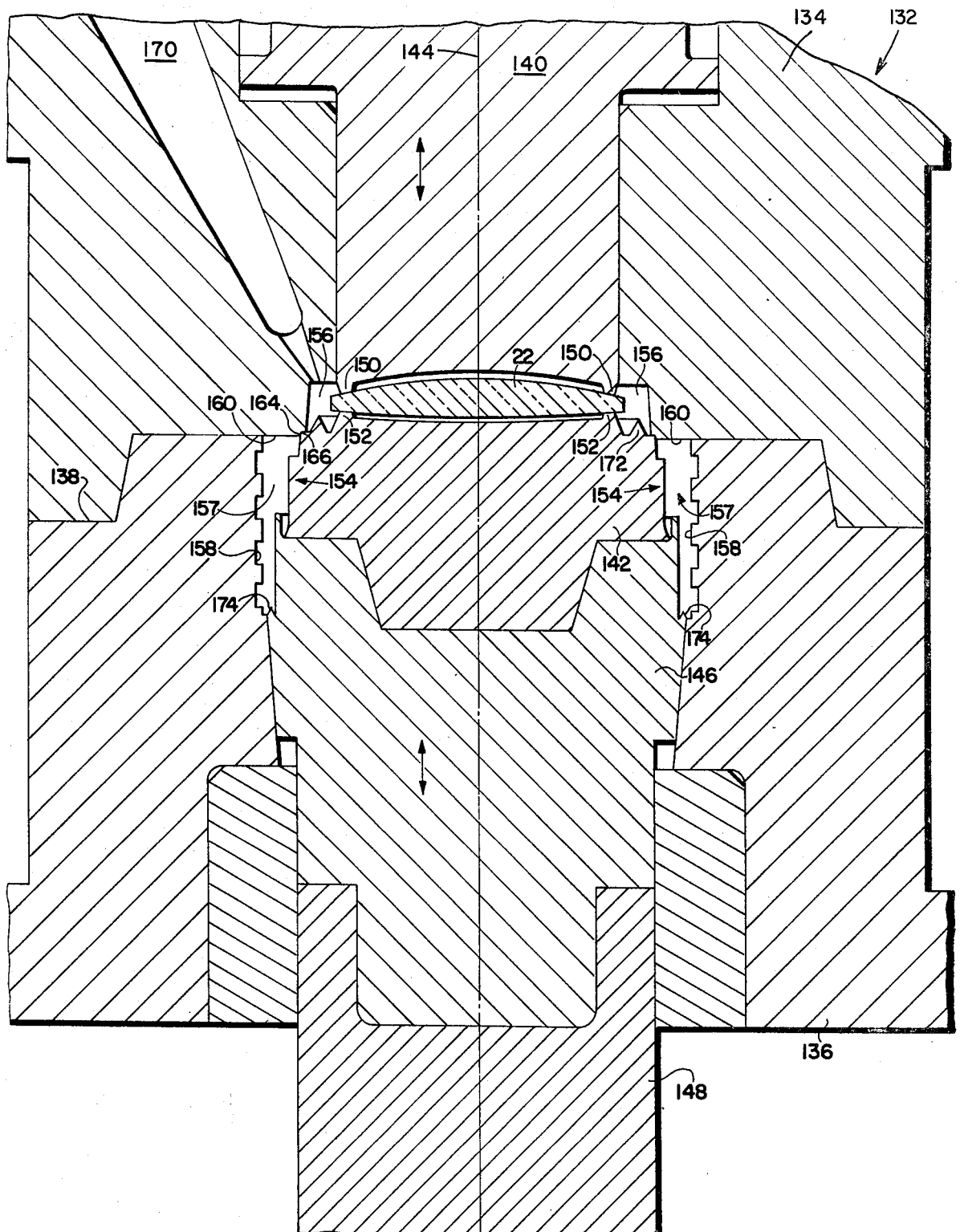
FIG. 5 is a sectional view of a molding device for forming the rear lens mount.

The rear lens mount 16 is formed in a two part cavity mold 132 shown in its closed position in FIG. 5. Mold 132 includes an upper mold section 134 and a lower mold section 136 which are movable relative to one another between an open position and a closed position wherein mold sections 134 and 136 are held in abutting relationship along a mold parting line designated 138.

The rear lens 22 is held between an opposed pair of zonal clamps 140 and 142. Zonal clamp 140 is centrally mounted in the upper mold section 134 for axial displacement along a vertical geometric axis 144 of mold 132. The axially disposed lower clamp 142 is preferably in the form of an insert that is keyed into a second insert 146 which is in turn keyed to a rotatable and axially displaceable shaft 148 in lower mold section 136.

Shaft 148 and inserts 146 and 142 secured thereto, are located in the fixed position of FIG. 5 relative to lower mold section 136, during the centering of lens element 22 and the subsequent molding process. Shaft 148 is rotated and displaced (upwardly) only during a mount ejection cycle.

The uncentered glass lens element 22 is centered with respect to the axis 144 in the same manner as previously described, with low friction rings 150 and 152 on clamps 140 and 142, respectively, bearing on the opposed curved surfaces of lens element 22. During the centering operation, the upper clamp 140 is moved downwardly to apply a compressive force on element 22 of approximately 130 to 170 pounds.

Surfaces on the lower end of clamp 140 and the upper end of clamp 142 (including a section 154 thereof outboard of ring 152) cooperate with a cavity 156 in upper mold section 134 to define a complementary cavity into which plastic is injected to form the annular support or retainer 58 including the forward and rear integrally molded retaining rings 60 and 62.

The cylindrical wall 54 of rear mount 16 is formed in a cavity 157 in the lower mold section 136. The external screw thread 26 is formed against an appropriately machined surface 158 in the fixed portion of lower mold section 136. The complementary cavity 157 for wall 54 is formed by surface 160 of upper mold section 134, the exterior surfaces of mold inserts 142 and 146, and surface 158.

The pair of transverse shutter blade slots 72 are integrally formed by providing an overlap of arcuate upper and lower mold surfaces. As best shown in FIG. 5, a pair of arcuate surfaces 164 (in a plane normal to mold axis 144) of the upper mold section 134 overlap a pair of arcuate surfaces 166 on the periphery of lower zonal clamp 142. Thus, in the areas where these surfaces 164 and 166 abut, (two 130° segments), there is no communication between the mold cavities for annular ring 58 and the cylindrical wall 54 thereby resulting in voids or slots 72 in the molded mount 16.

The plastic is injected into mold 132 through a plurality of gates 170 (only one of which is shown) into the cavity 156 forming annular ring 58. Communication for plastic flow from the upper cavity 156 forming annular ring 58 to the lower cavity 157 forming cylindrical wall 54 is provided at the bridge sections 69 where the mold surfaces 164 and 166 do not overlap thereby defining appropriate passage ways for the plastic to flow into the lower cavity 157.

The width of slots 72, measured parallel to mold axis 144, is approximately 0.060 of an inch and is controlled by the vertical differential between that horizontal surface 160 on upper mold section 134 and the horizontal surface 166 of zonal clamp 142. The radial overlap of mold surfaces 164 and 166 approximates 0.004 of an inch or half of the difference between the outside diameter of annular ring 58 and the inside diameter of surface 78 of cylindrical wall 54. In a preferred embodiment, the overlapped surfaces 164 and 166 may be beveled at 45° to the mold axis 144 to prevent flashing of plastic therebetween thereby providing sharp edges on the surfaces defining slots 72.

After the plastic has been injected, the upper mold section 134 is retracted or moved upwardly to open mold 132. The rotatable shaft 148 in lower mold section 136 is rotated relative to the fixed portion thereof and is displaced upwardly thereby unscrewing the molded mount 16 from the thread forming surface 158 of the fixed mold portion 136. The molded mount 16 is gripped or keyed to the rotating structure, for rotation therewith, at three locations by upstanding fingers 172 on zonal clamp section 154, upstanding fingers 174 on insert 146, and another set of fingers (not shown) on mold insert 146.

As best shown in FIG. 1, these mount gripping fingers leave recesses 176 in annular ring 58, recesses 178 at the leading end of cylindrical wall 54 and create slots 98 about the periphery of the heat deformable retainer 96.

After the molding operation, the pair of interior lens elements 18 and 20 are inserted into the rear mount 16 and retainer 96 is heat deformed to lock them in place. As noted earlier, the centering of interior pair of elements 18 and 20 with respect to one another and the forward and rear elements 14 and 22 is less critical to the optical performance of lens assembly 10 than is the centering requirements of lens elements 18 and 20. Therefore, if glass elements 18 and 20 are employed, their edges do not have to be edge ground to the same stringent tolerances as would be required of elements 14 and 22 were they to be mounted in a traditional machined metal mount.

Further manufacturing economy may be realized by substituting molded plastic elements 18 and 20 for glass elements as is disclosed in copending application Ser. No. 302,612. In that case, the peripheral edges of the interior elements may be molded to a precise diameter thereby eliminating the expense of edge grinding.

While this disclosure has been directed to a lens assembly 10 having glass forward and rear elements 14 and 22, it will be apparent to one having ordinary skill in the art that molded plastic lenses may be used instead, providing, of course, that suitable optical design paramaters are worked out and that the choice of plastic materials for the lens elements 14 and 22 is compatible with plastic material used for mounts 12 and 16 in terms of molding temperatures, etc.

As far as plastic materials used to mold mounts 12 and 16 are concerned, the important parameters include low shrinkage and dimensional stability, becuase of the precise tolerances, especially the tolerances for the helical screw threads 24 and 26. Suitable materials include substantially rigid and dimensionally stable thermoplastic and thermosetting polymers, for example, polycarbonates, polyesters, styrene polymers and copolymers, etc.

The molds 100 and 132 are adapted for use with standard and well known industrial plastic injection molding machines which may include specially designed components for automatically loading of lens elements to be insert molded and subsequently ejecting and removing the molded mounts.

In light of the tight tolerances of mounts 12 and 16, it will be noted that all mating parts of the two molds 100 and 132 are tapered at at abutting interfaces to improve the accuracy with which the mold mounts are aligned with respect to the geometric axis of the molds.

MOUNTING OF THE LENS ASSEMBLY IN A CAMERA

Figure 7:
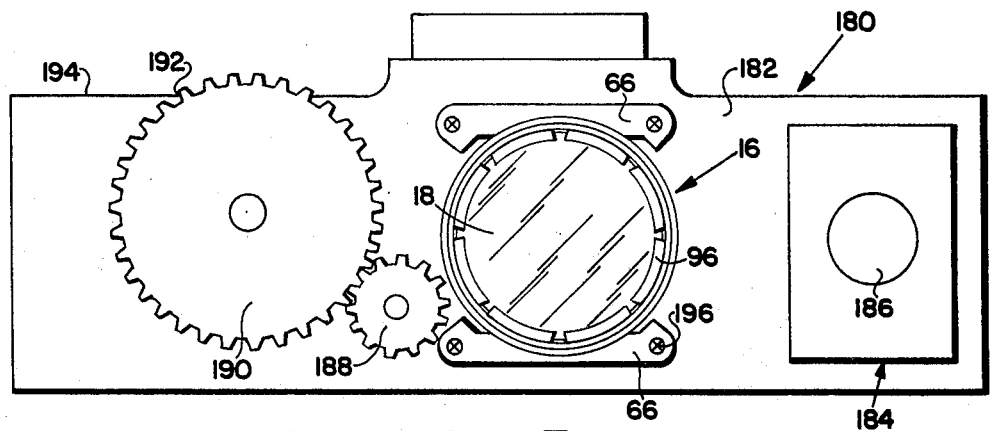
FIG. 7 is a diagrammatic illustration of a portion of a camera housing in which the lens assembly is adapted to be mounted and showing the rear mount attached to a wall of the camera housing.
Figure 8:
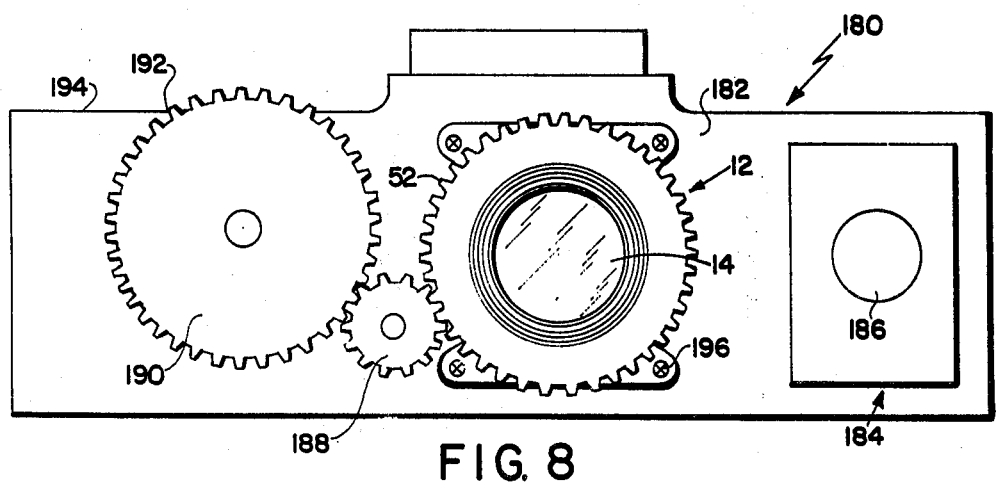
FIG. 8 is a diagrammatic view of the camera housing shown in FIG. 7 with the front mount in operative relation with a camera mounted lens focusing mechanism.

As noted earlier, lens assembly 10 is adapted to be mounted in a camera, preferably in a hollow lens and shutter housing 180 thereof shown in FIGS. 7 and 8. Housing 180 is generally parallelepiped in shape and is shown without its forward enclosing wall in place.

Lens assembly 10 is adapted to be mounted on a rear wall 182 of housing 180 in alignment with an appropriate opening (not shown) therein. FIG. 7 shows mount 16 positioned between an exposure control mechanism 184 which includes a photocell window 186 and a lens focusing mechanism comprising rotatably mounted meshed gears 188 and 190. It will be noted that a portion of the periphery of gear 190 extends through an opening 192 in a top wall 194 of housing 180 where it is accessible for the user to rotate gear 190 for focusing purposes.

The rear mount 16 is mounted on rear wall 182 by means of the upper and lower integrally formed mounting arms 66 which are fixedly secured by suitable screws or rivets 196 inserted through mounting holes 68 in arms 66.

Figure 6:
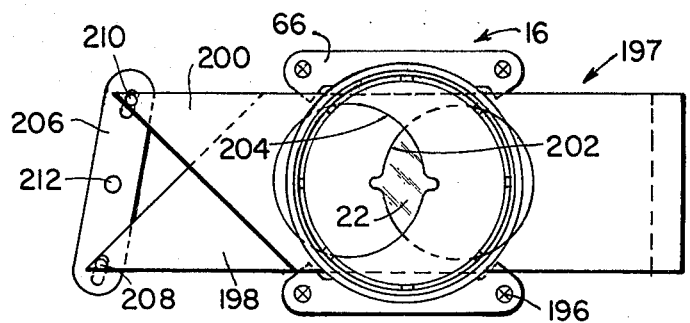
FIG. 6 shows a two bladed shutter and aperture defining mechanism in operative relation with the rear lens mount.

FIG. 6 shows a shutter and aperture defining mechanism 197 which is adapted to be mounted in housing 180. Mechanism 197 is not shown in FIGS. 7 and 8 for the sake of clearly showing the lens mounting arrangement. It includes an opposed pair of thin flat blades 198 and 200 extending through the transverse slots 72 in mount 16 to position blades 198 and 200 in the air space 27 between lens elements 20 and 22. Blades 198 and 200 are mounted for simultaneous movement, in opposite directions, transversely to the geometric axis 32, between positions bringing blade openings 202 and 204, in blades 198 and 200, respectively, into registration thereby unblocking the light path through lens assembly 10 and a blocking position wherein there is no light transmitting overlap of openings 202 and 204 to allow light to be transmitted through lens assembly 10. Between the extreme positions openings 202 and 204 cooperate to define various size aperture stops depending on the degree to which the blades 198 and 200 are moved relative to each other in opposite transverse directions. In a preferred embodiment, the blades 198 and 200 are moved by a walking beam link 206 having one end thereof pivotally coupled to blade 198 at sliding pivot point 208 and the opposite end thereof pivotally coupled to blade 200 at pivot 210.

In operation, beam link 206 is rotated about a midpoint pivot 212, in a clockwise direction (as viewed in FIG. 6) to bring openings 202 and 204 into registration thereby unblocking lens assembly 10 and in a counterclockwise direction to bring blades 198 and 200 into light blocking relation. Although not shown in the drawings, beam 206 is preferably rotatably driven by a solenoid mechanism that forms part of an automatic exposure control circuit.

While mechanism 197 has been shown to act both as a shutter and aperture defining structure, it would be obvious, in an alternative embodiment, to have it provide only either one of the two functions.

FIG. 8 shows the front mount 12 coupled to the rear mount 16 by means of the cooperating helical screw threads 24 and 26. In this position, the gear teeth on gear 188 mesh with the integrally formed molded gear teeth 52 on the exterior surface of lens mount 12. By rotating the focus wheel or gear 190, the user may cause mount 12 to rotate about its geometric axis 32 thereby resulting in axial displacement (along axis 32) of mount 12 through the helical screw threads 24 and 25 to focus lens assembly 10.

While the multi-element lens assembly 10 is of the adjustable focus type, it will be apparent that the inventive concepts disclosed herein may be utilized to produce other types of economical lens assemblies. For example, a structure similar to mount 16 may be used to produce a fixed focus multi-element lens. The rear element (or a forward element for that matter) would be insert molded into the mount and a second, third, or even fourth element would be inserted into an integrally formed hollow cylinder mount and held in place by the integrally formed seat and heat deformable retainer. In an alternative embodiment, a two element fixed focus lens may be produced by insert molding the rear element into a mount similar to mount 16 and insert molding the forward element into a mount similar to mount 12. The two mounts would be coupled together by integrally molded screw threads, similar to threads 24 and 26, to hold the two elements in a fixed relationship.

In the illustrated embodiment, the rear mount 16 was shown to include the pair of opposed slots 72 for locating the shutter mechanism 197 in the air space 27 between lens elements 20 and 22. It will be understood that with a different type of shutter and/or aperture defining mechanism, such as an iris diaphram type, only a single access opening or slot in the rear mount 16 may be required.

Since certain changes may be made in the above apparatus without departing from the scope of the invention herein involved, it is intended that all matter contained in the above description or shown in theh accompanying drawings shall be interpreted as illustrative and not in a limiting sense.

What is claimed is:

1. A molding device for forming a molded plastic lens mount having an uncentered lens element insert molded and centered therein such that the optical axis of the uncentered lens element coincides with a geometrical axis of the mount, the mount being of the type including intergrally molded means for retaining the uncentered lens element by the periphery thereof and a cylindrical wall having an axially disposed helical screw thread integrally molded therewith for coupling the lens mount to another lens mount having a complementary screw thread thereon, said molding device comprising:

a cavity mold including first and second mold sections movable relative to one another between an open position and a closed position wherein said first and second mold sections are aligned, on a common geometrical axis of said mold, in abutting relation, said first and second mold sections are aligned, on a common geometrical axis of said mold, in abutting relation, said first and second mold sections including cooperating means therein for defining an internal cavity within said closed mold into which plastic may be injected to form the mount, said cavity being complementary in shape to the shape of the molded plastic mount and being disposed within said closed mold such that the geometrical axis of the mount coincides with said geometrical axis of said mold;

said means for defining said cavity including first and second opposed zonal clamps mounted, on said geometrical axis of said mold, said first and second zonal clamps including low friction rings on their respective opposed ends for engaging opposite optical surfaces of the uncentered lens element, said first zonal clamp being mounted for axial displacement towards said second zonal clamp, when said mold is in said closed position and prior to the injection of the plastic, for causing said low friction rings to exert a compressive force on the uncentered lens element thereby displacing the uncentered lens element in directions transverse to said geometrical axis of said mold until the optical axis of the uncentered lens element is coincident with said geometrical axis of said mold and said second zonal clamp being mounted for both axial rotation and displacement to facilitate release of the molded plastic mount from said mold subsequent to the forming of the mount and when said first and second mold sections are in said open position;

said means defining said cavity including surfaces within said closed mold which form the retaining means around the periphery of the uncentered lens element held by said zonal clamps for retaining the uncentered lens element in the mount, and surfaces which form the cylindrical wall and the helical screw thread thereon, when plastic is injected into the mount; and means in at least one of said first and second mold sections for holding the molded plastic mount subsequent to the injection of plastic such that said second zonal clamp, mounted for axial rotation and displacement, may be rotated and displaced to disengage the molded mount and said mold surface forming the helical screw thread to facilitate the release of the molded mount from said mold.

2. A molding device as defined in claim 1 wherein the helical screw thread is formed on an interior surface of the cylindrical wall of the mount and said surface for forming the helical screw thread is on said second zonal clamp and said means for holding said molded mount is in said second mold section for preventing rotation of the mold mount relative to said second mold section as said second zonal clamp is rotated and displaced to disengage said surface forming said helical screw thread from said molded mount.

3. A molding device as defined in claim 2 wherein said second zonal clamp is mounted for displacement into said second mold section, in a direction away from said first mold section, to disengage said surface thereon forming said screw thread from said molded mount.

4. A molding device for forming a molded plastic lens mount having an uncentered lens element insert molded and centered therein such that the optical axis of the uncentered lens element coincides with a geometrical axis of the mount, the mount being of the type including integrally molded means for retaining the uncentered lens element by the periphery thereof and a cylindrical wall having an axially disposed helical screw thread integrally molded on the exterior surface thereof for coupling the lens mount to another lens mount having a complementary screw thread thereon, said molding device comprising:

a cavity mold including first and second mold sections movable relative to one another between an open position and a closed position wherein said first and second mold sections are aligned, on a common geometrical axis of said mold, in abutting relation, said first and second mold sections including cooperating means therein for defining an internal cavity within said closed mold into which plastic may be injected to form the mount, said cavity being complementary in shape to the shape of the molded plastic mount and being disposed within said closed mold such that the geometrical axis of the mount coincides with said geometrical axis of said mold;

said means for defining said cavity including first and second opposed zonal clamps mounted on said geometrical axis of said mold, said first and second zonal clamps including low friction rings on their respective opposed ends for engaging opposite optical surfaces of the uncentered lens element, said first zonal clamp being mounted for axial displacement towards said second zonal clamp, when said mold is in said closed position and prior to the injection of the plastic, for causing said low friction rings to exert a compressive force on the uncentered lens element thereby displacing the uncentered lens element in directions transverse to said geometrical axis of said mold until the optical axis of the uncentered lens element is coincident with said mold and said second zonal clamp being mounted for both axial rotation and displacement to facilitate release of the molded plastic mount from said mold subsequent to the forming of the mount and when said first and second mold sections are in said open position;

said means defining said cavity including surfaces within said closed mold which form the retaining means around the periphery of the uncentered lens element held by said zonal clamps for retaining the uncentered lens element in the mount, and surfaces which form the cylindrical wall and the helical screw thread thereon, when plastic is injected into the mount, said surface for forming the helical thread being in said second mold section; and means on said second zonal clamp for holding the molded plastic mount subsequent to the injection of plastic such that the molded mount rotates with said second zonal clamp and relative to said second mold section to disengage the molded mount from said surface forming the helical screw thread.

5. A molding device as defined in claim 4 wherein said second zonal clamp is mounted for displacement out of said second mold section, in a direction towards said first mold section, to disengage the molded mount from said surface in said second mold section forming said helical screw thread.

6. A molding device for forming a molded plastic lens mount having an uncentered lens element insert molded and centered therein such that the optical axis of the lens element coincides with a geometrical axis of the mount, the mount being of the type including integrally molded means for retaining the uncentered element in the mount and at least one access opening through which a between-the-lens shutter and/or aperture defining mechanism may extend, in operative relation with the insert molded lens element, for movement in directions transverse to the geometrical axis of the mount, said molding device comprising:

a cavity mold including first and second mold sections movable relative to one another between an open position and a closed position wherein said first and second mold sections are aligned on a common geometrical axis of said mold in abutting relation, said first and second mold sections including cooperating means therein for defining an internal cavity within said closed mold into which plastic may be injected to form the mount, said cavity being complementary in shape to the shape of the molded plastic mount and being disposed within said closed mold such that the geometrical axis of the mount coincides with said geometrical axis of the mold;

said means for defining said cavity including first and second opposed zonal clamps mounted on said geometrical axis of said mold, for engaging and centering the uncentered lens element on said geometrical axis of said mold, said first and second zonal clamps including low friction rings on their respective opposed ends for engaging opposite optical surfaces of the uncentered lens element, at least one of said zonal clamps being mounted for rotational displacement and also for axial displacement toward said other zonal clamp, when said first and second mold sections are located in said closed position, for causing said low friction annular rings to exert a compressive force on the uncentered lens element, thereby displacing the uncentered lens element in directions transverse to said geometrical axis of said mold until the optical axis of the uncentered lens element is coincident with said geometrical axis of said mold;

said means defining said cavity including surfaces therein which form the retaining means around the periphery of the lens element held by said zonal clamps, when plastic is injected into said mold, for retaining the lens element in the mount; and said means defining said cavity further including opposed surfaces that are in contacting relation within the bounds of said cavity, when said mold is closed, for selectively blocking the flow of plastic into predetermined portions of said cavity, thereby forming said at least one access opening in said molded mount, said access opening being formed in said mount in a configuration to allow a shutter and/or aperture defining mechanism to extend therethrough, in operative relation to the insert molded lens element, for movement in directions transverse to the geometrical axis of the mount.

7. A molding device as defined in claim 6 wherein said surfaces for selectively blocking the flow of plastic include portions of said second zonal clamp and fixed portions of said first mold section.

8. A molding device as defined in claim 7 wherein said surfaces for selectively blocking the flow of plastic are arcuate in shape.

9. A molding device as defined in claim 6 wherein said surfaces for selectively blocking the flow of plastic make contact in a plane that is transverse to said geometrical axis of said mold.

10. A molding device as defined in claim 6 wherein the mount includes a cylindrical wall extending forwardly of the molded lens retaining means and said at least one access opening is located intermediate the retaining means and an end of the cylindrical wall and wherein said cavity is configured such that a portion of said cavity for forming said retaining means is in said first mold section and another portion of said cavity, for forming the cylindrical wall, is in said second mold section, said opposed surfaces for selectively blocking the flow of plastic to form said at least one access opening being located at an interface between said first and second mold sections located in said closed position.

11. A molding device as defined in claim 10 wherein the mount includes an integrally molded external helical screw thread on the exterior surface of the cylindrical wall and said means for defining said cavity includes a surface in said second mold section which is appropriately configured to form the screw thread when plastic is injected into said cavity.

12. A molding device as defined in claim 10 wherein said first zonal clamp is mounted in said first mold section for axial displacement towards said second zonal clamp in said second mold section, when said mold is closed, to exert the compressive force on the lens element and said second zonal clamp is mounted in said second mold section for axial rotation and displacement when said mold is opened, said second zonal clamp including means thereon for gripping the molded cylindrical wall, such that rotation and axial displacement of said second zonal clamp cause the cylindrical wall to be disengaged from said surface of said second mold section defining the screw thread to eject the molded mount from said second mold section.

13. A method of forming a molded plastic lens mount having an uncentered lens element insert molded and centered therein such that the optical axis of said uncentered lens element coincides with a geometrical axis of said mount, said mount being of the type including retaining means molded around the periphery of said uncentered lens element for retaining said uncentered element in said mount and a cylindrical wall having an axially disposed screw thread integrally molded therewith for coupling said lens mount to another lens mount having a complementary screw thread thereon, said method comprising the steps of:

providing a cavity mold including first and second mold sections movable relative to one another between an open position and a closed position wherein said first and second mold sections are aligned, on a common geometrical axis of said mold, in abutting relation, said first and second mold sections including cooperating means therein for defining an internal cavity within said closed mold into which plastic may be injected to form said mount, said cavity defining means including first and second opposed zonal clamps mounted on said geometrical axis of said mold, said first and second zonal clamps including low friction rings on their respective opposed ends for engaging opposite surfaces of said uncentered lens element, said first zonal clamp being mounted for axial displacement relative to said first mold section and said second zonal clamp being mounted for both axial rotation and displacment relative to said second mold section;

with said first and second mold sections located in said open position, placing said uncentered lens element on said low friction ring of said second zonal clamp;

moving said first and second mold sections to the closed position;

axially displacing said first zonal clamp toward said second zonal clamp such that said low friction rings thereon engage the opposite optical surfaces of said uncentered lens element and exert a compressive pressure thereon thereby displacing said uncentered lens element in directions transverse to said geometrical axis of said mold until the optical axis of said uncentered lens element is coincident with said geometrical axis of said mount;

injecting plastic into said cavity of said closed mold to form said molded plastic mount around the periphery of said lens element held by said first and second zonal clamps;

moving said first and second mold sections to said open position; and axially rotating and displacing said second zonal clamp to disengage said molded mount and a surface in said mold for forming the helical screw thread on the cylindrical wall of the molded mount to facilitate the release of the molded mount from said mold.

14. The method of claim 13 wherein said helical screw thread is formed on an interior surface of said molded cylindrical wall by an appropriately shaped surface on said second zonal clamp and said molded mount is held to prevent its rotation relative to said second mold section while said second zonal clamp is axially rotated and displaced to disengage said screw thread forming surface from said molded mount.

15. The method of claim 14 wherein said second zonal clamp is displaced into said second mold section, in a direction away from said first zonal clamp, to disengage said screw thread forming surface from said molded mount.

16. The method of claim 13 wherein said uncentered lens element is formed of glass and said low friction rings on said first and second zonal clamps apply a compressive force, in the range of 130 to 170 pounds, to said glass element to center said glass element on said geometrical axis of said mold.

17. The method of claim 13 wherein said mount includes a pair of integrally molded opposed slots therein through which a between-the-lens shutter and/or aperture defining mechanism may extend for movement in directions transverse to said insert molded lens element and said pair of slots are formed by providing opposed surfaces in said first and second mold sections which are in contacting relation within the bounds of said cavity when said mold is closed for selectively blocking the flow of plastic into predetermined portions of said cavity to form said pair of opposed slots.

18. A method of forming a molded plastic lens mount having an uncentered lens element insert molded and centered therein such that the optical axis of said uncentered lens element coincides with a geometrical axis of said mount, said mount being of the type including retaining means molded around the periphery of said uncentered lens element for retaining said uncentered element in said mount and a cylindrical wall having an axially disposed screw thread integrally molded on an exterior surface thereof for coupling said lens mount to another lens mount having a complementary screw thread thereon, said method comprising the steps of:

providing a cavity mold including first and second mold sections movable relative to one another between an open position and a closed position wherein said first and second mold sections are aligned, on a common geometrical axis of said mold, in abutting relation, said first and second mold sections including cooperating means therein for defining an internal cavity within said closed mold into which plastic may be injected to form said mount, said cavity defining means including an appropriately shaped surface in said second mold section for forming said helical screw thread, and first and second opposed zonal clamps mounted on said geometrical axis of said mold, said first and second zonal clamps including low friction rings on their respective opposed ends for engaging opposite surfaces of said uncentered lens element, said first zonal clamp being mounted for axial displacement relative to said first mold section and said second zonal clamp being mounted for both axial rotation and displacement relative to said second mold section;

with said first and second mold sections located in said open position, placing said uncentered lens element on said low friction ring of said second zonal clamp;

moving said first and second mold sections to the closed position;

axially displacing said first zonal clamp toward said second zonal clamp such that said low friction rings thereon engage the opposite optical surfaces of said uncentered lens element and exert a compressive pressure thereon thereby displacing said uncentered lens element in directions transverse to said geometrical axis of said mold until the optical axis of said uncentered lens element is coincident with said geometrical axis of said mount;

injecting plastic into said cavity of said closed mold to form said molded plastic mount around the periphery of said lens element held by said first and second zonal clamps;

moving said first and second mold sections to said open position; and while holding the molded mount with means on the second zonal clamp, axially rotating and displacing said second zonal clamp to disengage said molded mount and the surface in said mold for forming the helical screw thread on the cylindrical wall of the molded mount to facilitate the release of the molded mount from said mold.

19. The method of claim 18 wherein said second zonal clamp is displaced out of said second mold section, in a direction towards said first zonal clamp, to disengage said molded mount from said thread forming surface.

* * * * *